United States Patent Office 3,361,837

Patented Jan. 2, 1968

1

3,361,837

BICYCLIZATION

Paul R. Stapp, Bartlesville, Okla., assignor to Phillips Petroleum Company, a corporation of Delaware No Drawing. Filed Oct. 18, 1965, Ser. No. 497,452
4 Claims. (Cl. 260—666)

This invention relates to a method for forming bicyclic olefins, particularly bicyclo[3.2.1]oct-2-enes. In another aspect this invention relates to a catalyst for forming bicyclic olefins, particularly bicyclo[3.2.1]-oct-2-enes.

Heretofore bicyclo[3.2.1]oct-2-enes have been formed by various procedures, some of which are quite complex and inefficient.

Quite surprisingly, it has now been found that such bicyclic olefins can be readily formed from 4-vinylcyclohexene and alkyl substituted derivatives thereof using a catalyst formed on admixing a rare earth and/or yttrium halide with lithium aluminum hydride.

Accordingly, the catalyst of this invention is that formed on admixing a rare earth and/or yttrium halide with lithium aluminum hydride.

Accordingly, an object of this invention is to provide a new and improved method for forming bicyclic olefins. Another object of this invention is to provide a new and improved catalyst for forming bicyclic olefins. Still another object is to provide a process and catalyst for the preparation of bicyclo[3.2.1]oct-2-ene.

Other aspects, objects and the several advantages of this invention will be readily apparent to those skilled in the art from the description and the appended claims.

According to this invention, the catalyst is that obtained by admixing at least one rare earth or yttrium chloride, bromide, or iodide, preferably chloride, with lithium aluminum hydride. The rare earth halides are halides of the metals of atomic number 57 through 71, inclusive. These include lanthanum, cerium, praseodymium, neodymium, promethium, samarium, europium, gadolinium, terbium, dysprosium, holmium, erbium, thulium, ytterbium, and lutetium. Yttrium, while not specifically a rare earth metal, is frequently classed with the rare earths because it is frequently found with the rare earths in nature and resembles the rare earths in chemical behavior.

The mixing of the halide and the lithium aluminum hydride can be carried out in any conventional manner such as by simple dry or liquid blending, stirring, ball milling, and the like, preferably in the presence of an inert medium such as aliphatic, cycloaliphatic, or aromatic hydrocarbon having from 1 to 12 carbon atoms per molecule, inclusive and mixtures thereof. The mixing time and temperature can vary widely but will generally be from about 1 minute to about 5 days and from about 20° C. to about 300° C., preferably from about 20 to about 100° C. The catalyst can also be prepared in situ in the reaction zone by separately adding the rare earth and/or yttrium component and lithium aluminum hydride component thereto. Generally, the mole ratio of rare earth and/or yttrium halide to lithium aluminum hydride will vary from about 0.1/1 to about 10/1, preferably from about 0.25/1 to about 1/1.

The vinylcyclohexenes which are suitable for conversion to bicyclo[3.2.1]oct-2-enes according to this invention are represented by the formula:

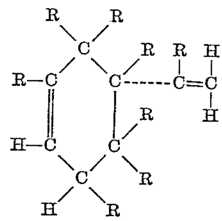

2 wherein R is selected from the group consisting of hydrogen, and alkyl radicals containing from 1 to 8 carbon atoms, preferably 1 to 2 carbon atoms, and wherein the total number of carbon atoms in the molecule does not exceed 20.

Some examples of these vinylcyclohexenes are 4-vinylcyclohexene, 4-methyl-4-vinylcyclohexene 5-methyl-4-isopropenylcyclohexene, 2-methyl-4-isopropenylcyclohexene, 3,4-dimethyl-4-vinylcyclohexene, 3,5-dimethyl-4-vinylcyclohexene, 5-n-octyl-4-vinylcyclohexene, 2,5,6-triisobutyl-4-vinylcyclohexen, 5,5-dimethyl-4-vinylcyclohexene, 2,3,3,4,5,5,6-heptamethyl-4-vinylcyclohexene, 4-(1-n-amylvinyl)cyclohexene, and the like.

The bicyclo[3.2.1]oct-2-ene products which are obtained by this invention will correspond to the vinylcyclohexene utilized and are represented by the formula:

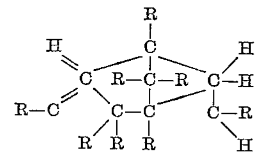

wherein R is as defined previously.

Some examples of these products are bicyclo[3.2.1]oct-2-ene, 5-methylbicyclo[3.2.1]oct-2-ene, 4,6-dimethylbicyclo[3.2.1]oct-2-ene, 1,6-dimethylbicyclo[3.2.1]oct-2-ene, 5,8-dimethylbicyclo[3.2.1]oct-2-ene, 4,8-dimethylbicyclo[3.2.1]oct-2-ene, 4-n-octylbicyclo[3.2.1]oct-2-ene, 1,3,4-triisobutylbicyclo[3.2.1]oct-2-ene, 4,4-dimethylbicyclo[3.2.1]oct-2-ene, 1,3,4,4,5,8,8-heptamethylbicyclo[3.2.1]oct-2-ene, 6-n-amylbicyclo[3.2.1]oct-2-ene, and the like.

The catalyst of this invention and at least one of the 4-vinylcyclohexenes are then contacted in any conventional contacting apparatus, either in the presence or absence of a diluent, to produce the desired bicyclic olefin. A diluent is generally preferred and any liquid which is inert to the vinylcyclohexenes, catalyst, and bicyclic olefin produced can be employed, preferred diluents being those employed as the inert medium in the catalyst preparation step discussed hereinabove. Additional diluents which can be employed are ethers having from 2 to 8 carbon atoms per molecule, inclusive, and trialkylamines having from 3 to 12 carbon atoms per molecule, inclusive. The time of contacting the catalyst and vinylcyclohexenes can vary widely but will generally be in the range of from about 15 minutes to about 24 hours. The reaction pressure can vary widely and will generally be that which is sufficient to maintain the reactants substantially in a liquid phase, but can vary from about 100 to about 5000 p.s.i.g. The reaction temperature can also vary broadly and will generally be that sufficient to effect bicyclization but is preferably in the range of from about 150 to about 300, more preferably from about 200 to about 250° C. The amount of catalyst employed will generally be from about 0.01 to about 10 weight percent based on the vinylcyclohexene present.

After completion of the reaction the bicyclic olefin can be isolated from the reaction mixture by conventional methods such as solvent extraction, distillation, adsorption, crystallization, and the like.

*Example I*

A catalyst was prepared by mixing 0.76 g. (20 millimoles) of lithium aluminum hydride, 4.92 g. (20 millimoles) of cerous chloride, and 100 ml. of dry benzene in a dry nitrogen atmosphere at room temperature for about 18 hr.

The catalyst was transferred to a 1-liter autoclave along with 249 g. of 4-vinylcyclohexene and 100 ml. of additional benzene. The autoclave was heated to 230° C. for 6 hr. under autogenous pressure. The autoclave was allowed to cool to room temperature, was opened, and 421 g. of a light yellow liquid reaction mixture was removed. After removal of benzene by fractionation this reaction mixture was analyzed by gas-liquid chromatography and found to contain 47.6 wt. percent based on the total weight of the reaction mixture, bicyclo[3.2.1]oct-2-ene and a vinylcyclohexene conversion of 84%.

After isolation by preparative scale gas chromatography the identity of the above bicyclo olefin was confirmed by its infrared spectra, nuclear magnetic resonance spectra, and mass spectrometer cracking patterns.

*Example II*

A sample of 4-vinylcyclohexene was treated according to the procedure of Example I except that lithium aluminum hydride was used as the sole catalyst. The total conversion of 4-vinylcyclohexene obtained was about 9 percent. This was only about 1/9 of the conversion obtained when using the catalyst of this invention in Example I.

*Example III*

The catalyst preparation steps and the 4-vinylcyclohexene reaction of Example I were repeated except that titanium tetrachloride was substituted for the cerous chloride. No appreciable quantities of bicyclic olefin were produced by the process of this example.

*Example IV*

The catalyst preparation steps and vinylcyclohexene reaction step of Example I were repeated using 250 grams of 4-vinylcyclohexene, 4.92 grams (20 millimoles) of cerous chloride, 1.52 grams (40 millimoles) of lithium aluminum hydride and 300 milliliters of benzene under varying reaction conditions of time and temperature. Results are set forth in the following table:

| Run No. | Reaction Temperature, ° C. | Reaction Time, Hours | Conversion of 4-vinycyclohexene, percent | Ultimate Yield of Bicyclic Olefin, percent |
|---|---|---|---|---|
| 1 | 250 | 3 | 96.5 | 35.5 |
| 2 | 230 | 6 | 98.7 | 37.5 |
| 3 | 220 | 18 | 97.5 | .. |

*Example V*

In another example, triethylaluminum was substituted for one-half of the lithium aluminum hydride in a test which showed that not all such aluminum containing reducing agents are equivalent. In a run directly comparable with Run No. 2 of Example IV above, in which 4-vinylcyclohexene was contacted with 20 millimoles of cerous chloride, 20 millimoles of lithium aluminum hydride and 20 millimoles of triethylaluminum, the conversion was drastically reduced from 98.7% to 26%.

Reasonable variations and modifications are possible within the scope of this disclosure without departing from the spirit and scope thereof.

I claim:

1. A method comprising contacting under bicyclization conditions at least one of 4-vinylcyclohexene and alkyl substituted derivatives thereof, wherein the alkyl radicals have from 1 to 8 carbon atoms, with a catalyst formed on admixing one of cerium chloride, cerium bromide, and cerium iodide, with lithium aluminum hydride.

2. The method according to claim 1 wherein is employed at least one cerium compound selected from the group consisting of cerous chloride and cerous bromide.

3. A method for forming bicyclo[3.2.1]oct-2-ene comprising contacting under bicyclization conditions 4-vinylcyclohexene with a catalyst formed on admixing cerous chloride and lithium aluminum hydride.

4. The method according to claim 3 wherein the catalyst is formed by mixing at a temperature in the range of from about 20 to about 300° C. using a molar ratio of cerous chloride to lithium aluminum hydride in the range of from about 0.1/1 to about 10/1, the bicyclization conditons including a temperature in the range of from about 150 to about 300° C., and the catalyst formation and bicyclization reaction are carried out in the presence of at least one aromatic hydrocarbon which contains from 6 to 12 carbon atoms per molecule, inclusive.

References Cited

UNITED STATES PATENTS 3,274,271 9/1966 Muller et al. ---------- 260—666
2,953,531 9/1960 Anderson et al. ----- 260—94.3

OTHER REFERENCES

A. F. Bickel et al.: Tetrahedron, vol. 9, pp. 230–236, 1960.

PAUL M. COUGHLAN, Jr., *Primary Examiner.*
DELBERT E. GANTZ, *Examiner.*
V. O'KEEFE, *Assistant Examiner.*